United States Patent
Ohkubo et al.

(10) Patent No.: US 6,612,961 B2
(45) Date of Patent: Sep. 2, 2003

(54) FORWARD-REVERSE ROTATION DEVICE FOR A CONTINUOUSLY VARIABLE TRANSMISSION

(75) Inventors: Masahiro Ohkubo, Kyoto (JP); Koji Yoneyama, Osaka (JP)

(73) Assignee: Exedy Corporation, Osaka (JP)

(*) Notice: Subject to any disclaimer, the term of this patent is extended or adjusted under 35 U.S.C. 154(b) by 0 days.

(21) Appl. No.: 10/061,197

(22) Filed: Feb. 4, 2002

(65) Prior Publication Data

US 2002/0115523 A1 Aug. 22, 2002

(30) Foreign Application Priority Data

Feb. 19, 2001 (JP) .......................... 2001-041209

(51) Int. Cl.[7] ................................................ F16H 3/44
(52) U.S. Cl. ....................................... 475/319; 475/322
(58) Field of Search ................................ 475/319, 320, 475/321, 322

(56) References Cited

U.S. PATENT DOCUMENTS

| | | | | |
|---|---|---|---|---|
| 2,494,738 A | * | 1/1950 | Booth | 475/322 |
| 2,583,556 A | * | 1/1952 | Fleischel | 475/322 |
| 2,877,668 A | * | 3/1959 | Kelbel | 475/322 |
| 2,918,832 A | * | 12/1959 | Meyers | 475/322 |
| 3,069,929 A | * | 12/1962 | Hansen | 475/322 |
| 4,860,615 A | * | 8/1989 | Huber et al. | 475/322 |
| 5,024,636 A | * | 6/1991 | Phebus et al. | 475/321 |

FOREIGN PATENT DOCUMENTS

| | | |
|---|---|---|
| JP | 4-285354 A | 10/1992 |
| JP | 10-252860 A | 9/1998 |
| JP | 2000-55150 A | 2/2000 |

* cited by examiner

*Primary Examiner*—Dirk Wright
(74) *Attorney, Agent, or Firm*—Shinjyu Global IP Counselors, LLP (57) ABSTRACT

A forward-reverse rotation device for a continuously variable transmission is provided to reduce the manufacturing cost of a forward-reverse rotation device for a continuously variable transmission. A forward-reverse rotation device 2 for a continuously variable transmission is equipped with a planetary gear set 5, a reverse brake 7, and a forward clutch 6. The planetary gear set 5 has a sun gear 11 provided on an input shaft 8, a ring gear 14, double planetary gears 12, and a carrier 13 that axially supports the double planetary gears 12 and serves to output power to output shaft 9. The brake 7 is for allowing and prohibiting the rotation of the ring gear 14. The clutch 6 is a mechanism for coupling and releasing the input shaft 8 to and from the carrier 13. The sun gear 11 and splines 17 are formed integrally on an external circumferential surface of the input shaft 8. The clutch 6 has a clutch drum 18 that has internal splines 18e that are press-formed integrally into the clutch drum and mesh with the splines 17.

10 Claims, 6 Drawing Sheets

FORWARD-REVERSE ROTATION DEVICE FOR A CONTINUOUSLY VARIABLE TRANSMISSION

BACKGROUND OF THE INVENTION

1. Field of the Invention

The present invention relates to a forward-reverse rotation device. More specifically, the present invention relates to a forward-reverse rotation device used in a continuously variable transmission.

2. Background Information

Conventional forward-reverse rotation devices generally used in continuously variable transmissions have a planetary gear set having a double planetary gear, a reverse brake, and a forward clutch. In this type of forward-reverse rotation device, the sun gear is coupled to the power input from the engine and the planet carrier is coupled to the output because the gear ratio for reverse is approximately equal to the gear ratio for direct forward drive (i.e., 1:1). During forward motion, the sun gear, which serves as the input, and the planet carrier, which serves as the output, are coupled together directly by the forward clutch.

For example, in one conventional forward-reverse rotation device the sun gear is splined to an external circumferential surface and is near the tip of the input shaft. Further, the clutch drum is also fixed by welding to the external circumferential surface and is near the tip of the input shaft. The planet carrier is coupled to the output shaft via an output hub. The output hub is splined to the output shaft and also welded to the planet carrier.

In another conventional forward-reverse rotation device, the sun gear is formed integrally with the input shaft. The forward clutch drum is coupled to the input shaft via an input hub. The input hub is splined to the input shaft and is also welded to the forward clutch drum. The planet carrier is coupled to the output shaft via an output hub. The output hub is spliced to the output shaft and also welded to the to the planet carrier.

In either of these forward-reverse rotation devices, both splines and welding are used to couple the input and output shafts to other members. Welding is generally more difficult than machining to execute and, consequently, is more expensive. There is also the disadvantage of elongating the device in the axial direction.

The output part of the planet carrier is a cylindrical portion that protrudes from the carrier main body toward the output side in the axial direction and has splines formed on its internal circumferential surface. Since the portion of the planet carrier that is supported by the output shaft is displaced or overhangs axially from the center of gravity of the planet carrier, it is easy for the planet carrier have "center run out." There is also the possibility that the meshing contact of the double planetary gear will degrade.

In view of the above, there exists a need for a forward-reverse rotation device for a continuously variable transmission that overcomes the above-mentioned problems in the prior art. This invention addresses this need in the prior art as well as other needs, which will become apparent to those skilled in the art from this disclosure.

SUMMARY OF THE INVENTION

An object of the present invention is to reduce the manufacturing cost of a forward-reverse rotation device for a continuously variable transmission.

Another object of the present invention is to improve the meshing contact of the double planetary gears in a forward-reverse rotation device for a continuously variable transmission.

The forward-reverse rotation device for a continuously variable transmission in accordance with a first aspect of the present invention has an input shaft, an output shaft, a planetary gear set, a reverse brake, and a forward clutch. The planetary gear set has a sun gear provided on the input shaft, a ring gear, a double planetary gear, and a planet carrier. The planet carrier axially supports the double planetary gear and serves to output power to the output shaft. The reverse brake facilitates and prohibits rotation of the ring gear. The forward clutch couples and releases the input shaft to and from the carrier. The sun gear and some spline teeth are formed integrally on the external circumferential surface of the input shaft. The forward clutch has a clutch drum that has internal splines. The internal splines are press-formed integrally and interlock with the spline teeth.

In this device, the sun gear and spline teeth are formed integrally on the input shaft and the clutch drum interlocks directly with the spline teeth of the input shaft. Thus, unlike the prior art, there is no need for welding and manufacturing costs are reduced.

A forward-reverse rotation device for a continuously variable transmission in accordance with a second aspect of the present invention is the device of the first aspect, wherein a hollow part that is open at the tip is formed in the tip of the input shaft. Further, the tip of the output shaft is positioned inside the hollow part. The planet carrier has a carrier member that has an output part that splines together with the external circumferential surface of the tip of the output shaft inside the hollow part.

With this device, the orientation of the double planetary gear is stable. Further, poor meshing contact is reduced because the output part of the carrier member is disposed inside the hollow part formed in the tip face of the input shaft.

A forward-reverse rotation device for a continuously variable transmission in accordance with a third aspect of the present invention is the device of the second aspect, wherein the sun gear is formed on the external circumferential surface of the input shaft near the tip thereof. Further, the output part of the carrier member is positioned radially inward with respect to the sun gear.

In this device, the orientation of the double planetary gear is stable. Poor meshing contact is also reduced because the output part of the carrier member is positioned radially inward with respect to the sun gear.

A forward-reverse rotation device for a continuously variable transmission in accordance with a fourth aspect of the present invention is the device of the third aspect, wherein the carrier member has a main body part and an output part that is cylindrical. The output part is formed integrally with the main body part to bend therefrom. The output part is disposed inside the hollow part.

In this device, the output part of the carrier member is formed integrally so as to bend from the main body part. Consequently, the manufacturing cost is reduced.

A forward-reverse rotation device for a continuously variable transmission according to a fifth aspect of the present invention is the device of any of the aforementioned aspects, wherein a first toothed part and a second toothed part are formed on the external circumferential surface of the input shaft near the tip thereof. The first toothed part constitutes the sun gear. The second toothed part constitutes the spline teeth. The second toothed part is formed by cutting the height of a toothed part that connects in an uninterrupted manner with and has the same shape as the first toothed part.

This device is easier to fabricate because the second toothed part is formed by cutting a portion of the first toothed part.

A forward-reverse rotation device for a continuously variable transmission in accordance with a sixth aspect of the present invention is the device of any of the aforementioned aspects, wherein the sun gear has an axially facing end face that faces in a direction opposite the tip. Further, the tip face of the clutch drum touches the axially facing end face of the sun gear such that movement of the clutch drum toward the tip is limited.

The structure of this device is simplified because axial movement of the clutch drum is limited by the sun gear.

A forward-reverse rotation device for a continuously variable transmission in accordance with a seventh aspect of the present invention is the device of sixth aspect, wherein an axially opposite end face that faces a direction opposite the tip is formed on the clutch drum. Furthermore, a washer is provided which serves to position the clutch drum with respect to the input shaft in the axial direction by touching the axially opposite end face.

A forward-reverse rotation device for a continuously variable transmission in accordance with an eighth aspect of the present invention is the device of the seventh aspect, wherein a thrust bearing is further provided for supporting the input shaft in the axial direction. The washer is a portion of the thrust bearing.

A forward-reverse rotation device for a continuously variable transmission in accordance with a ninth aspect of the present invention is the device of any one of the first to fourth aspects, wherein an annular groove is formed in the internal splines of the clutch drum. Further, an annular groove is formed at a corresponding position in the splined shaft of the input shaft. The forward-reverse rotation device is also provided with ring member that is inserted into the grooves and to limit axial motion between the clutch drum and the input shaft.

A forward-reverse rotation device for a continuously variable transmission in accordance with a tenth aspect of the present invention is the device of any one of sixth to ninth aspects, wherein the clutch drum has a clutch piston, a return spring, and a holding member. The return spring returns the clutch spring. The holding member holds the return spring. The tip face of the holding member touches the axially facing end face of the sun gear.

A forward-reverse rotation device for a continuously variable transmission in accordance with an eleventh aspect of the present invention has an input shaft, a planetary gear set, a reverse brake, and a forward clutch. The planetary gear set has a sun gear, a ring gear, a double planetary gear, and a planet carrier. The sun gear is provided on the input shaft. The planet carrier supports the double planetary gear. The reverse brake facilitates and prohibits rotation of the ring gear. The forward clutch couples and releases the input shaft to and from the planet carrier. The planet carrier has a carrier member that has an output part positioned at the center of gravity of the planet carrier.

With this device, the orientation of the double planetary gear is stable. Further, poor meshing contact is reduced because the output part of the planet carrier is positioned at the center of gravity of the planet carrier.

A forward-reverse rotation device for a continuously variable transmission in accordance with a twelfth aspect of the present invention is the device of the eleventh aspect, wherein the output part of the carrier member is disposed radially inward with respect to the double planetary gear.

A forward-reverse rotation device for a continuously variable transmission in accordance with a thirteenth aspect of the present invention is the device of the twelfth aspect, wherein a hollow part that opens at the tip is formed in the tip of the input shaft. Further, the output part of the carrier member is disposed inside the hollow part.

A forward-reverse rotation device for a continuously variable transmission in accordance with a fourteenth aspect of the present invention is the device of the thirteenth aspect, wherein the sun gear is formed on the external circumferential surface of the input shaft near the tip thereof. Further, the output part of the carrier member is positioned radially inward with respect to the sun gear.

A forward-reverse rotation device for a continuously variable transmission in accordance with a fifteenth aspect of the present invention is the device of the fourteenth aspect, wherein the carrier member has a main body part. Further, the output part is cylindrical and formed integrally with the main body part to bend therefrom. The output part disposed inside the hollow part. Spline slots are formed on the internal circumferential surface of the output part.

These and other objects, features, aspects, and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Figure 1:
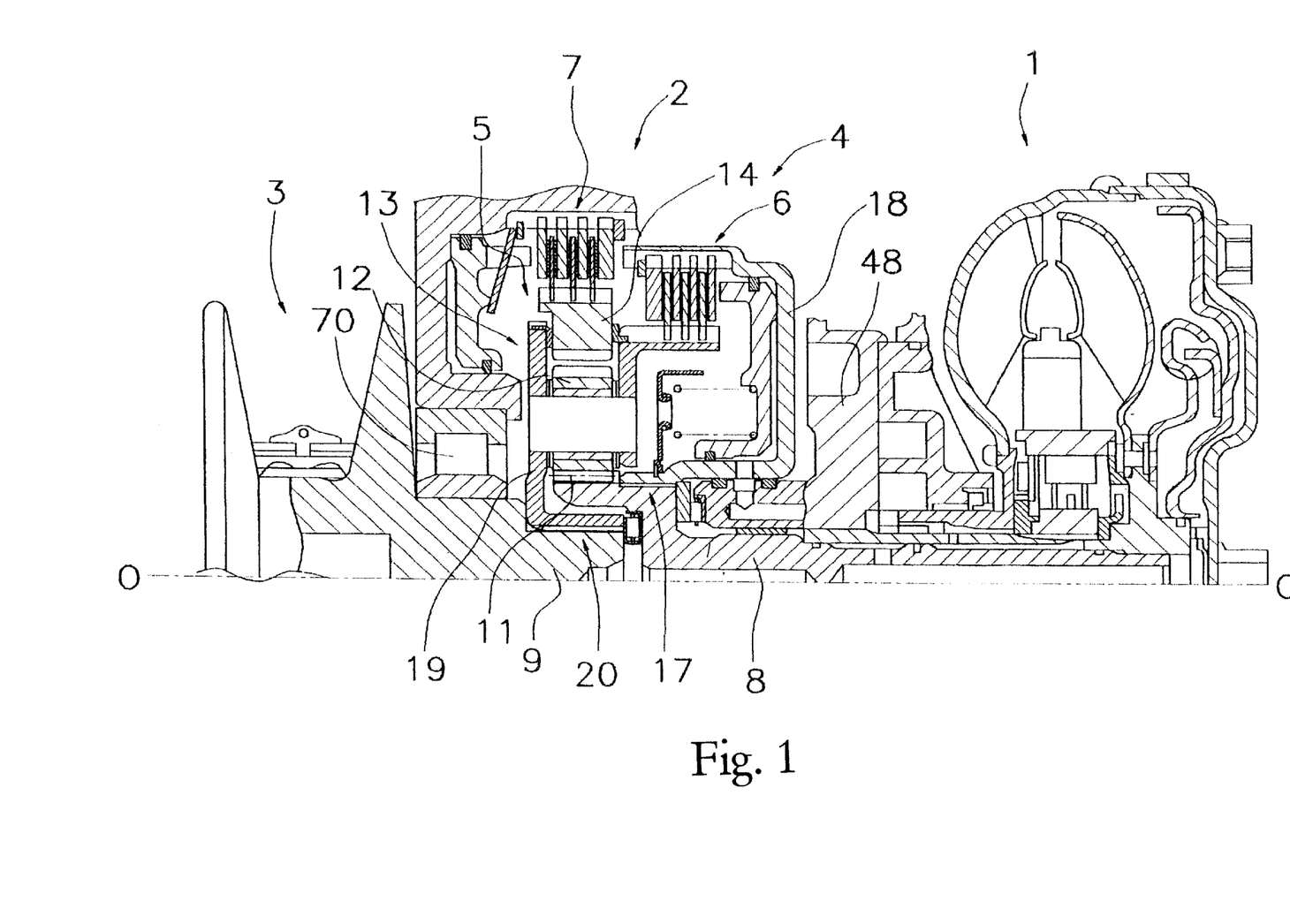
FIG. 1 is a cross sectional view illustrating a power transmission switching unit in accordance with a preferred embodiment of the present invention.

A power transmission switching unit in accordance with a preferred embodiment of the present invention is shown in FIG. 1. The power transmission switching unit shown in FIG. 1 is equipped with a torque converter 1, a continuously variable transmission forward-reverse rotation device 2, and a belt-type continuously variable transmission 3. Power is inputted from the engine (not shown) to the torque converter 1. A line O—O represents the rotational axis of the power transmission switching unit. The right side of FIG. 1, the side where the torque converter 1 is located, shall be referred to as the first axial side. The left side, the side where the continuously variable transmission 3 is located, shall be referred to as the second axial side.

The forward-reverse rotation device 2 outputs the rotation of an input shaft 8 that extends from the torque converter 1 to an output shaft 9. The output shaft 9 extends from the continuously variable transmission 3. The output shaft 9 reverses the direction of the drive rotation from the torque converter in order to allow the vehicle to operate in reverse. The forward-reverse rotation device 2 is equipped with a forward-reverse switching device 4 and a planetary gear set 5 whose power transmission path is switched by the forward-reverse switching device 4. The forward-reverse switching device 4 has a forward hydraulic clutch unit 6 to which power is transmitted from the torque converter 1 and a reverse hydraulic brake unit 7 that controls the planetary gear set 5.

Figure 2:
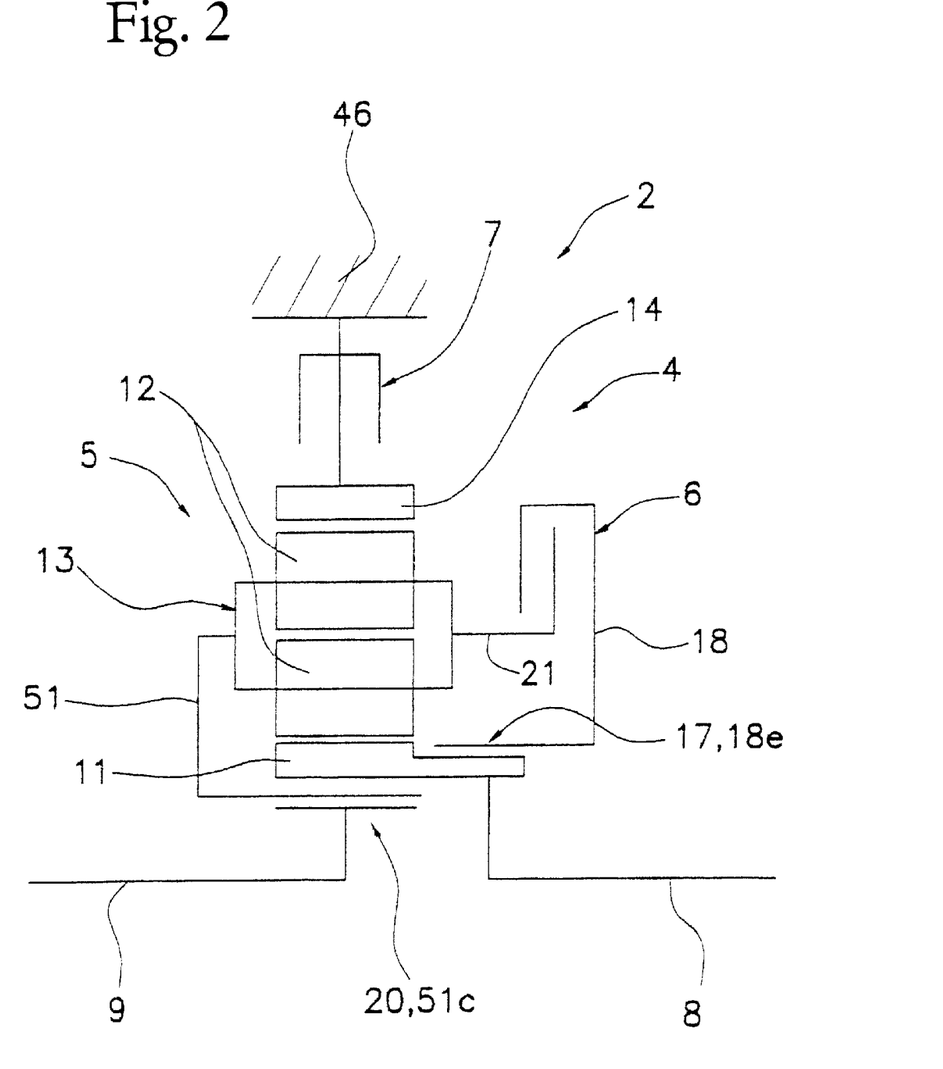
FIG. 2 is a skeleton view of a forward-reverse rotation device of the unit of FIG. 1.

The planetary gear set 5 has a sun gear 11, a ring gear 14, and a double pinion planetary gear 12. The sun gear 11 is formed on the tip of the input shaft 8. Rotation of the ring gear 14 is facilitated and prohibited by the reverse hydraulic brake unit 7. The double pinion planetary gear 12 meshes with the sun gear 11 and the ring gear 14. The sun gear 11 and the ring gear 14 are disposed concentrically. The double planetary gear 12 meshes with the sun gear 11 and the ring gear 14. The double planetary gear 12 is supported in a freely rotatable manner on a planet carrier 13. The planet carrier 13 is coupled to the output shaft 9.

Figure 3:
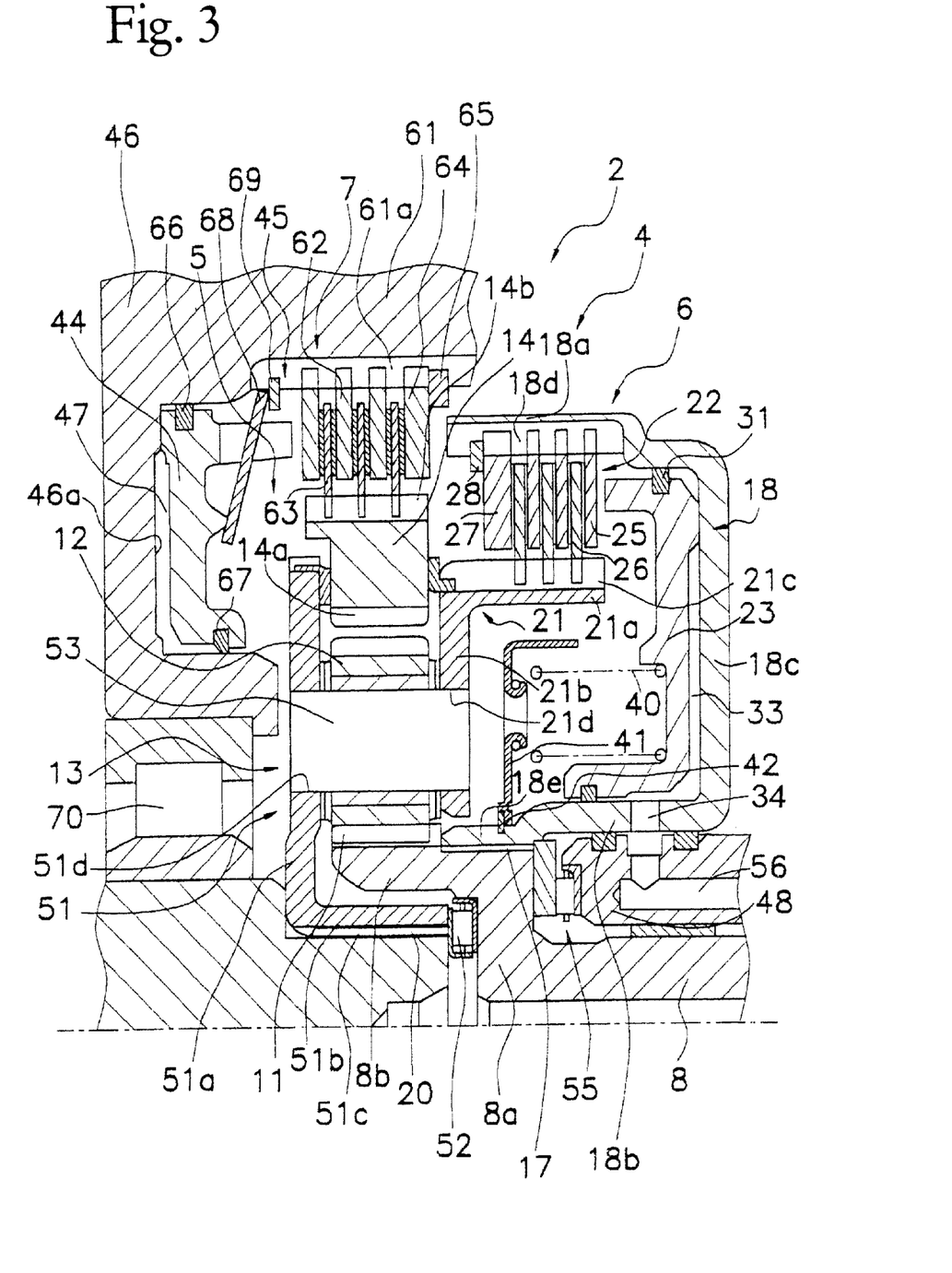
FIG. 3 is a cross sectional view illustrating the forward-reverse rotation device of FIG. 1.

As shown in FIG. 3, a flange 8a and a cylindrical part 8b are formed on the tip of the input shaft 8. The cylindrical part 8b extends toward the second axial side from an outer edge of the flange 8a. In short, there is a hollow section formed in the tip face of the input shaft 8. The sun gear 11 and splines 17 are formed on the external circumferential surface of the cylindrical part 8b. The sun gear 11 is closer to the second axial side relative to the splines 17. In other words, the splines 17 are formed on the side of the sun gear 11 that is closer to the first axial side. The external diameter of the splines 17 is preferably larger than the internal diameter of the sun gear 11. A thrust needle bearing 55 is disposed between the flange 8a and a wall 48 of the transmission housing on the side closer to the torque converter.

Referring to FIGS. 1 and 3, the output shaft 9 extends from the primary pulley of the continuously variable transmission 3. The tip of the output shaft 9 extends inside the cylindrical part 8b. More specifically, the tip face of the output shaft 9 is very close to the flange 8a of the input shaft 8. Further, a gap is secured between the external circumferential surface of the tip of the output shaft 9 and the internal circumferential surface of the cylindrical part 8b. Splines 20 are formed on the external circumferential surface of the tip of the output shaft 9. The output shaft 9 is supported in a freely rotatable manner in a transmission case 46 by way of a bearing 70.

The forward hydraulic clutch unit 6 has a clutch drum 18, a second side member 21, a clutch section 22, and a piston 23. The second side member 21 is a portion of the planet carrier 13 disposed inside the clutch drum 18. The clutch section 22 controls the transmission of power between the clutch drum 18 and the second side member 21. The piston 23 is disposed such that it can slide freely inside the clutch drum 18.

The clutch drum 18 preferably has a cylindrical form that opens toward the second axial side. The clutch drum 18 has an outer cylindrical part 18a, an inner cylindrical part 18b, and a side wall part 18c. The side wall part 18c is formed between one end of the outer cylindrical part 18a and one end of the inner cylindrical part 18b. The clutch drum 18 is a single unit that is not welded.

The outer cylindrical part 18a is formed to have a wavy shape such that it has a plurality of meshing-purpose recessions and protrusions 18d. The inner cylindrical part 18b is formed roughly parallel to the outer cylindrical part 18a and has internal splines 18e formed on the internal circumferential surface of its tip. The internal splines 18e are spline slots formed by machining with a broach. The internal splines 18e mesh with the splines 17 of the input shaft 8. The internal diameter of the portion of the inner cylindrical part 18b that is closer to the first axial side is preferably larger than the external diameter of the internal splines 18e.

The second side member 21 is arranged on one side of the planet carrier 13 (discussed later). The second side member 21 also functions as a clutch hub that holds a first clutch plate 25. The second side member 21 is provided on the inside of the clutch drum 18. The second side member 21 has a cylindrical part 21a and a disk-shaped stationary part 21b. The disk-shaped stationary part 21b is formed integrally with the cylindrical part 21a. The side of the cylindrical part 21a adjacent to the planetary gear set 5 is bent inward toward the rotational axis such that the disk-shaped stationary part 21b extends toward the rotational axis. The cylindrical part 21a is formed to have a wavy shape such that it has a plurality of meshing-purpose recessions and protrusions 21c on its external cylindrical surface. A hole 21d is formed in the stationary part 21b. The hole 21d axially supports the double planetary gear 12.

The clutch section 22 is disposed between the outer cylindrical part 18a of the clutch drum 18 and the cylindrical part 21a of the second side member 21. The clutch section 22 has a plurality of first clutch plates 25 and second clutch plates 26. The two sets of clutch plates 25, 26 are arranged alternately in the axial direction. Each of the first and second clutch plates 25, 26 is an annular plate member. The external circumferential section of each first clutch plate 25 has a plurality of meshing-purpose teeth that mesh with the meshing-purpose recessions and protrusions 18d of the clutch drum 18. The internal circumferential section of each second clutch plate 26 has a plurality of meshing-purpose teeth that mesh with the meshing-purpose recessions and the protrusions 21c of the second side member 21. Additionally, both lateral faces of each second clutch plate 26 are provided with a friction member.

With this arrangement, the first clutch plates 25 can move freely in the axial direction but cannot rotate with respect to the clutch drum 18. Further, the second clutch plates 26 can move freely in the axial direction but cannot rotate with respect to the second side member 21.

A backup plate 27 is provided on the second axial side of the plurality of second clutch plates 26 (i.e. the clutch plate 26 farthest to the left in FIG. 3). The backup plate 27 has the same shape as the first clutch plates 25 except that its thickness differs and is preferably greater. A stop ring 28 for restricting axial motion is provided on the internal circumferential surface of the outer cylindrical part 18a of the clutch drum 18. The stop ring 28 is provided on the second axial side of the backup plate 27.

The piston 23 is disposed between the clutch section 22 and the side wall part 18c of the clutch drum 18. The piston 23 is a roughly ring-shaped member having a seal ring 31 and a seal ring 32. The seal ring 31 is in sliding contact with the internal circumferential surface of the outer cylindrical part 18a of the clutch drum 18 provided on its external circumference. The seal ring 32 is in sliding contact with the external circumferential surface of the inner cylindrical part 18b of the clutch drum 18 provided on its internal circumference. Thus, a cylinder chamber 33 is formed between the piston 23 and the clutch drum 18. Operating oil is supplied to the cylinder chamber 33 through a plurality of holes 34 that are formed in the inner cylindrical part 18b of the clutch drum 18 and aligned in the circumferential direction. An oil groove 56 that extends from a hydraulic pressure control valve (not shown) is formed in the wall 48 of the transmission housing. The two seal rings touch against the internal circumferential surface of the inner cylindrical part 18b and seal the oil path.

Figure 4:
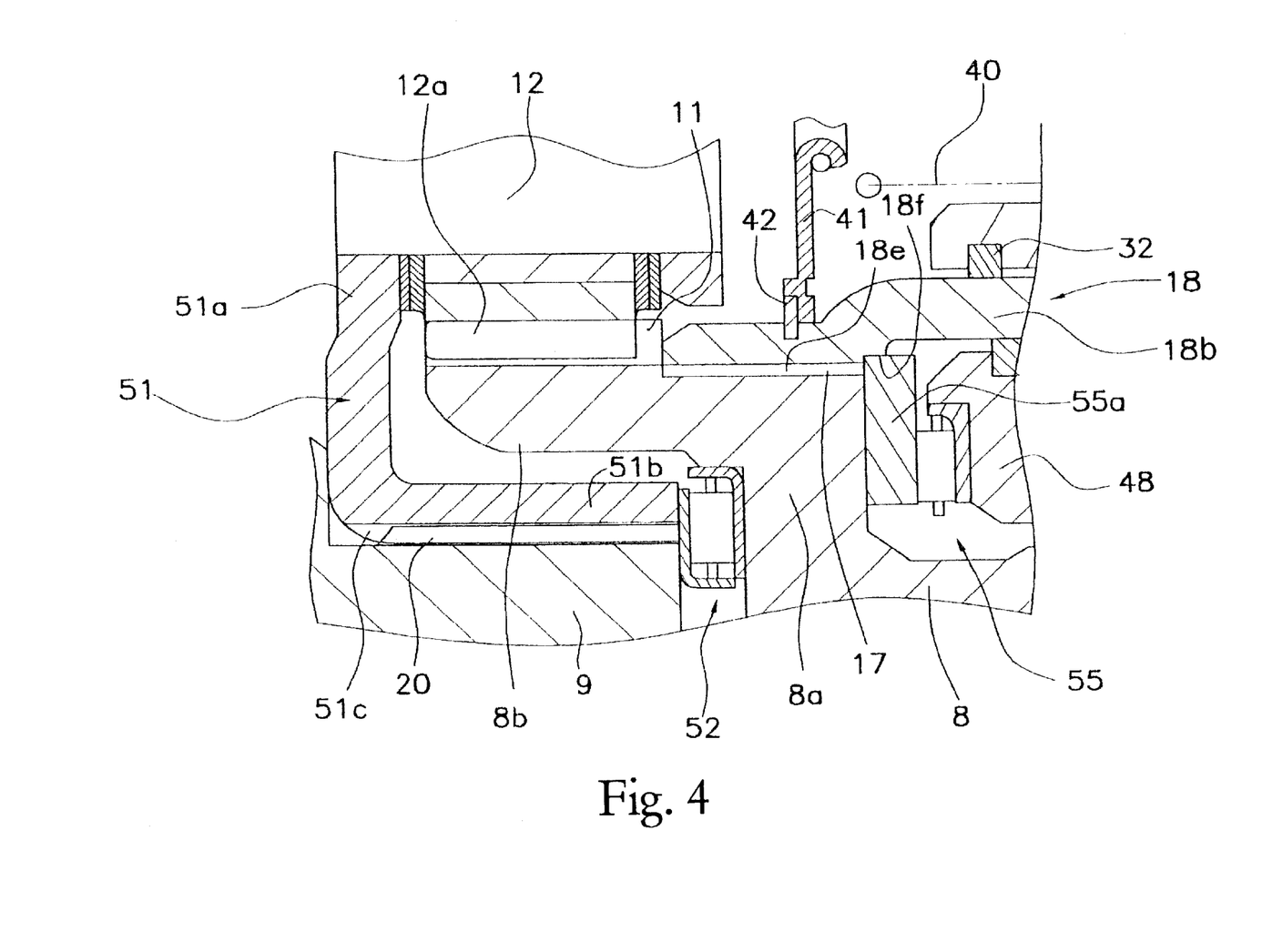
FIG. 4 is an enlarged view of an inner radial section of the forward-reverse rotation device of FIG. 3.

A return spring 40 serves to push the piston 23 in a direction such that it separates from the clutch section 22 (i.e., toward the first axial side). The return spring 40 includes at least one and preferably a plurality of coil springs arranged such that they touch a lateral face of the piston 23 on its second axial side. The end part of each return spring 40 on the second axial side is supported by a retaining plate 41 (retaining member). The retaining plate 41 is an annular plate member. As best seen in FIG. 4, an inner edge of the retaining plate 41 is supported on its second axial side by a ring member 42. The ring member 42 is fastened to the external circumferential surface of the inner cylindrical part 18b of the clutch drum 18.

A second axial side end face of the inner cylindrical part 18b of the clutch drum 18 touches a first axial side end face of the sun gear 11. A step part 18f is formed on a first axial side of the internal splines 18e of the inner cylindrical part 18b. The external circumferential edge of a washer 55a of the thrust needle bearing 55 touches the step part 18f. In other words, the external circumferential surface of the washer 55a fits into a portion of the inner cylindrical part 18b. The aforementioned portion has an internal diameter that is larger than the external diameter of the splines 17. Thus, the washer 55a can rotate relative to the inner cylindrical part 18b. In short, since the tip portion of the clutch drum 18 where the internal splines 18e are formed is sandwiched axially between the sun gear 11 and the thrust needle bearing 55, the input shaft 8 cannot move in the axial direction except for a slight amount of play.

As shown in FIG. 3, the reverse hydraulic brake unit 7 has a piston 44 and a brake section 45. The brake section 45 has a plurality of first and second brake plates 62, 63 that press against one another by the piston 44. The brake section 45 is disposed between the ring gear 14 and an internal circumferential surface part 61 of the transmission case 46. The two sets of brake plates 62, 63 are arranged alternately in the axial direction. Each of the first and second brake plates 62, 63 is an annular plate member. The external circumferential section of each first brake plate 62 has a plate member. The external circumferential section of each first brake plate 62 has a plurality of meshing-purpose teeth that mesh with splines 61a of the internal circumferential surface part 61. The internal circumferential section of each second brake plate 63 has a plurality of meshing-purpose teeth that mesh with the external teeth 14b of the ring gear 14. Additionally, both lateral faces of each second brake plate 63 are provided with a friction member.

With this arrangement, the first brake plates 62 can move freely in the axial direction but cannot rotate with respect to the transmission case 46. Further, the second brake plates 63 can move freely in the axial direction but cannot rotate with respect to the ring gear 14.

A backup plate 64 has the same shape as the first brake plates 62 except for its thickness, which is preferably larger. The backup plate 64 is provided on a first axial side of the farthest first axial side second brake plate 63 (i.e. the second brake plate 63 farthest to the right in FIG. 3). A stop ring 65 for restricting axial motion is provided on the internal circumferential surface part 61 on a first axial side of the backup plate 64.

The piston 44 is provided between the brake section 45 and a side wall part 46a of the transmission case 46. The piston 44 is a roughly ring-shaped member having a seal ring 66 and a seal ring 67. The seal ring 66 is in sliding contact with an internal circumferential surface of an outer circumferential wall of the transmission case 46. The seal ring 66 is provided on an external circumference of the piston 44. The seal ring 67 is in sliding contact with the external circumferential surface of inner circumferential wall of the transmission case 46 provided on its internal circumference. Thus, a cylinder chamber 47 is formed between the piston 44 and the side wall part 46a of the transmission case 46. When operating oil is supplied to the cylinder chamber 47, the piston 44 moves in the first axial direction and presses the first and second brake plates 62, 63 against one another.

A return spring 68 serves to push the piston 44 in a direction such that it separates from the brake section 45 (i.e., toward the second axial side). The return spring 68 preferably includes at least one cone spring arranged such that it touches the lateral face of the internal circumferential section of the piston 44 that faces toward the second axial side. The outer edge of the return spring 68 is supported by a ring member 69 that is fixed to the internal circumferential surface part 61. The inner edge of the return spring 68 touches against the piston 44.

As previously described, the planetary gear set 5 includes the sun gear 11, the double planetary gear 12, the ring gear 14, and the planet carrier 13. As described earlier, the allowance and prohibition of the rotation of the ring gear 14 is controlled by the reverse hydraulic brake unit 7. That is, the ring gear 14 can rotate freely when it is not coupled to the brake unit 7. The two axially facing sides of the ring gear 14 are supported by first and second side members 51, 21 of the planet carrier 13 with washers in between. The ring gear 14 has internal teeth 14a and external teeth 14b.

There are preferably a total of six double planetary gears 12 that have three pairs of double pinions that mesh with each other. Between each pair, one planetary gear 12 meshes with the sun gear 11 and the other planetary gear 12 meshes with the ring gear 14. More specifically, the gear teeth 12a of the other planetary gear 12 mesh with the internal teeth 14a of the ring gear 14.

The double planetary gears 12 are mounted to the planet carrier 13 in such a manner that they can rotate freely. The planet carrier 13 chiefly has a first side member 51 (carrier member) and a second side member 21. The first side member 51 is closer to the second axial side. The second side member 21 constitutes the output member of the clutch unit 6. Although not shown in the figures, portions at three locations of the first side member 51 are preferably bent toward the second side member 21 such that they extend between the pairs of double planetary gears and are welded to the second side member 21.

The first side member 51 is an output hub coupled to the output shaft 9. The first side member 51 includes a disk shaped stationary part 51a and a cylindrical part 51b. The cylindrical port 51b is formed integrally so as to bend from the inner circumferential edge of the stationary part and extend toward the first axial side.

A hole 51d into which one end of a shaft 53 is press fitted is formed in the stationary part 51a. The cylindrical part 51b extends into the cylindrical part 8b of the input shaft 8. A thrust needle bearing 52 is disposed between the tip of the cylindrical part 51b and the flange 8a of the input shaft 8.

Spline slots 5*c* are formed in the internal circumferential surface of the cylindrical part 51*b*. The spline slots 51*c* are made by broaching and mesh with the splines 20 of the output shaft 9. In short, the cylindrical part 51*b* is the output part of the planet carrier 13. Further, the cylindrical part 51*b* is basically in the same axial position as the internal portion of the sun gear 11. The cylindrical part 51*b* is also aligned with the center of gravity of the planet carrier 13. As described previously, the first side member 51 is formed integrally as a single unit and is not welded. Since the clutch drum 18 is also a single unit (also mentioned earlier), welding on both the input and output shafts is eliminated, resulting in low cost.

Each planetary gear 12 can rotate freely about the shaft 53, which is press fitted into the side members 51 and 21. Since the internal circumferential section of the first side member 51 of the planet carrier 13 (which serves as the output hub) is bent such that it enters the internal circumferential section of the sun gear 11 and is splined to the output shaft 9, the axial length of the entire device is shortened and the transmission becomes more lightweight and compact. Furthermore, the offset load that acts on the spline slots 51*c*, which serve as the output section of the planet carrier 13, is reduced because the spline slots 51*c* are provided at the center of gravity of the planet carrier 13. The spline slots 51*c* mesh with the splines of the output shaft 9 at a section internal to the sun gear 11. Additionally, since the run out of the entire planet carrier 13 is reduced, the meshing contact of the double planetary gears 12 is improved and noise is prevented.

Next the operation is described.

When in Neutral

When in a neutral state, neither the forward hydraulic clutch unit 6 nor the reverse hydraulic brake unit 7 is engaged. Consequently, power inputted to the forward clutch unit 6 is not transmitted through the second side member 21 to the planetary gear set 5. Nor is the rotation of the planet carrier 13 braked. In this state, power from the torque converter is not transmitted to the belt-type continuously variable transmission 3.

When in Forward

Referring to FIGS. 1 and 3, when forward, operating oil is supplied to the forward hydraulic clutch unit 6 and the forward hydraulic clutch unit 6 engages. In short, the planet carrier 13 is made to rotate integrally with the input shaft 8. Meanwhile, operating oil is not supplied to the reverse hydraulic brake unit 7 and, consequently, the ring gear 14 of the planetary gear set 5 can rotate freely. Power from the torque converter is transmitted to the output shaft 9 through the clutch unit 6 and the planet carrier 13 and outputted to the belt-type continuously variable transmission 3. The belt-type continuously variable transmission 3 rotates in the same direction as the torque converter 1. Furthermore, in this state, all gears 11, 12, 14 of the planetary gear set 5 rotate synchronously as a single unit and the torque from the torque converter is neither multiplied nor reduced but, rather, transmitted directly to transmission 3.

When in Reverse

When in reverse, the forward hydraulic clutch unit 6 is disengaged and the reverse hydraulic brake unit 7 is operated or braking. As a result, the rotation of the ring gear 14 of the planetary gear set 5 is prohibited. In this state, the power from the torque converter is transmitted from the sun gear 11 to the double planetary gears 12 and the planet carrier 13 and then to the output shaft 9 of the belt-type continuously variable transmission 3. Since the ring gear 14 is prohibited from rotating by the hydraulic brake unit 7, the planet carrier 13 rotates in the opposite direction as the sun gear 11 and the output shaft 9 rotates in the opposite direction as it rotates during forward operation.

Other Embodiments

Figure 5:
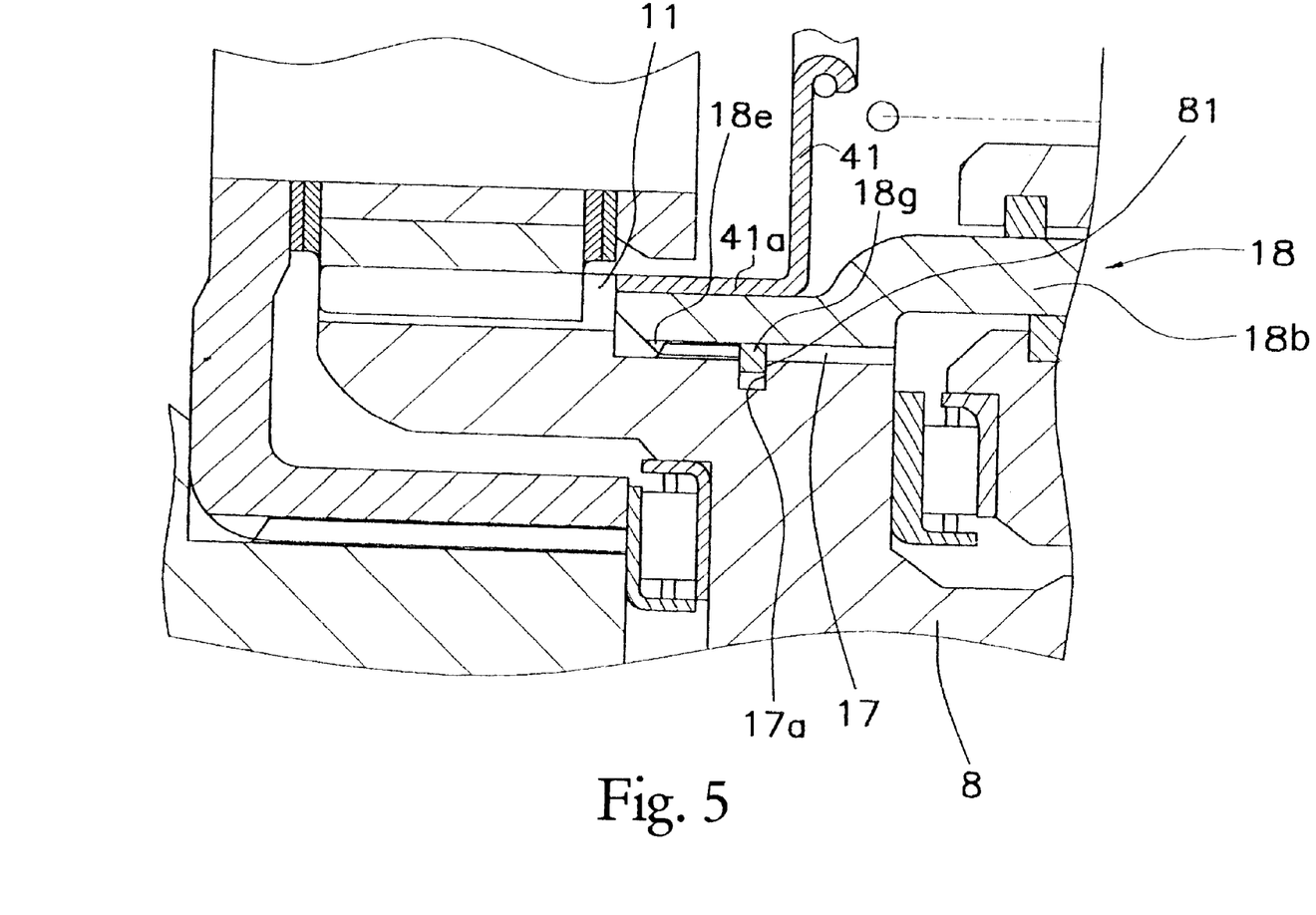
FIG. 5 is a view of an alternate embodiment of the present invention corresponding to FIG. 4.
Figure 6:
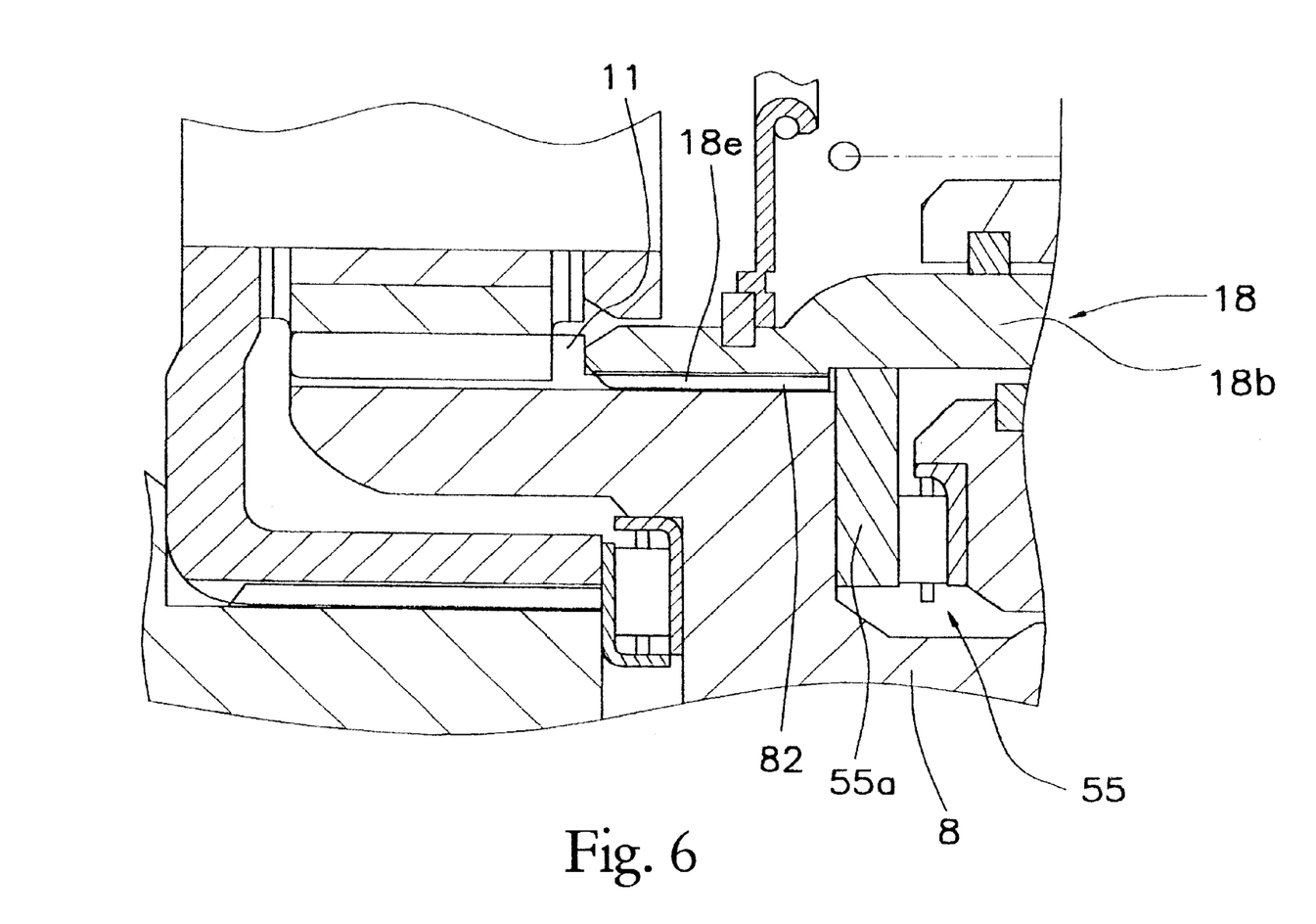
FIG. 6 is a view of another alternate embodiment of the present invention corresponding to FIG. 4.

Referring now to FIGS. 5–6, a forward-reverse rotation device for a continuously variably transmission in accordance with alternate embodiments of the present invention will now be discussed. In view of the similarites between the following embodiments and the first embodiment, discussed above, the components or parts of the alternate embodiments that have the same function of the corresponding components or parts of the first embodiment are being given the identical reference numerals. Moreover, the explanations of components or parts and the operations of the following embodiments that are similar to components or parts and the operations of the first embodiment will be omitted. Only components and operations of the alternate embodiments that are different in structure and function from the first embodiment will be explained herein. In short, the embodiments listed below have the same basic structure as the previously described embodiment. Only the differences are described.

(1) In the embodiment shown in FIG. 5, an annular first groove 18*g* is machined into the internal splines 18*e* of the clutch drum 18. An annular second groove 17*a* is made in the splines 17 of the input shaft 8 at a position corresponding to the first groove 18*g*. A retaining ring 81 capable of elastic deformation is fitted into the two grooves 18*g*, 17*a*. The retaining ring 81 restricts axial motion between the clutch drum 18 and the input shaft 8. The second groove 17*a* is deeper than the valleys of the splines 17. When the retaining ring 81 contracts, its external diameter moves farther inward than the valleys of the splines 17.

In this embodiment, a portion of the retaining plate 41 (which holds the return spring) touches a first axial side end face of the sun gear 11. Further, the ring that was used with the retaining plate 41 in the previous embodiment is omitted. More specifically, a cylindrical part 41*a* is formed on an inner circumferential edge of the retaining plate 41. The cylindrical part 41*a* projects toward the second axial side. The cylindrical part 41*a* is supported by an external circumferential surface of the tip of the inner cylindrical part 18*b* of the clutch drum 18 (i.e., the external circumferential surface of the portion where the splines 18*e* are formed). The tip face of the inner cylindrical part 18*b* abuts against the face of the sun gear 11 that faces toward the first axial side.

(2) In the embodiment shown in FIG. 6, the sun gear 11 is formed integrally with the input shaft 8 in the same manner as in the previously described embodiment. Splines 82 are formed on the side of the sun gear 11 that is closer to the first axial side. The splines 82 are a short-toothed portion made by cutting a gear having the same shape as the sun gear 11 so that the tooth height is lowered. The splines 82 mesh with the splines 18*e* of the clutch drum 18. As in the first embodiment, the tip face of the clutch drum 18 touches against the side of the sun gear 11 that faces the first axial side and limits motion in the axial direction.

In this embodiment, the sun gear and splines are made by forming a gear that is long in the axial direction on the external circumferential surface of the input shaft and then cutting a portion of that gear. Thus fabrication is easier and the cost is lower than in the prior art.

(3) The positioning of a continuous variable transmission-use forward-reverse rotation device in accordance with the present invention is not limited to that of the previously described embodiments. More particularly, it is also acceptable for the forward-reverse rotation device to be disposed on the opposite side of the torque converter or on the opposite side of the continuously variable transmission (i.e., more toward the second axial side).

(4) The coupling relationships of the hydraulic clutch unit and the hydraulic brake unit with the planetary gear set are not limited to those of the previous embodiments. Numerous variations are possible.

(5) The structure of the planet carrier is not limited to that of the previous embodiments. The planet carrier can also be formed by sintering. Additionally, the piston of the forward clutch unit and/or the piston of the reverse brake unit may be bonded a piston. The return spring for returning the piston is not limited to coil springs or a cone spring and may also be a wavy spring.

Effects of the Invention

In the forward-reverse rotation device of the present invention, the sun gear and spline teeth are formed integrally on the input shaft and the clutch drum meshes directly to the spline teeth of the input shaft. Unlike the prior art, welding is unnecessary and manufacturing costs are reduced.

The terms of degree such as "substantially," "about," and "approximately" as used herein mean a reasonable amount of deviation of the modified term such that the end result is not significantly changed. These terms should be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing description of the embodiments according to the present invention are provided for illustration only, and not for the purpose of limiting the invention as defined by the appended claims and their equivalents.

What is claimed is:

1. A forward-reverse rotation device for a continuously variable transmission comprising:
   an input shaft;
   an output shaft;
   a planetary gear set having,
      a sun gear provided on said input shaft, said sun gear and spline teeth being formed integrally on an external circumferential surface of said input shaft,
      a ring gear,
      a double planetary gear, and
      a planet carrier axially supporting said double planetary gear and being configured to output power to said output shaft,
   a reverse brake being configured to facilitate and prohibit rotation of said ring gear; and
   a forward clutch being configured to couple and release said input shaft to and from said carrier, said forward clutch having a clutch drum having internal splines, said internal splines being press-formed integrally on an internal circumferential surface thereof, said internal splines being configured to mate with said spline teeth.

2. The forward-reverse rotation device for a continuously variable transmission according to claim 1, further comprising,
   a hollow part that opens at a tip, said hollow part is formed in a tip of said input shaft, wherein said tip of said output shaft is positioned in said hollow part, said planet carrier has a carrier member, and said carrier member has an output part that splines with an external circumferential surface of said tip of said output shaft inside said hollow part.

3. The forward-reverse rotation device for a continuously variable transmission according to claim 2, wherein said sun gear is formed on an external circumferential surface of said input shaft near a tip thereof and said output part of said carrier member is positioned radially inward of said sun gear.

4. The forward-reverse rotation device for a continuously variable transmission according to claim 3, wherein said carrier member has a main body part and said output part is cylindrical, formed integrally with said main body part so as to bend therefrom, and is disposed inside said hollow part.

5. The forward-reverse rotation device for a continuously variable transmission according to claim 1, wherein said sun gear has a first toothed part and said spline teeth have a second toothed part, said first toothed part and said second toothed part are formed on an external circumferential surface of said input shaft near a tip thereof and said second toothed part is formed by cutting the height of a toothed part that connects in an uninterrupted manner with and has the same shape as said first toothed part.

6. The forward-reverse rotation device for a continuously variable transmission according to claim 1, wherein said sun gear has an axially facing end face that faces in a direction opposite a tip of said input shaft, and a tip face of said clutch drum contacts said axially facing end face of said sun gear an such that movement of the clutch drum toward said tip of said input shaft is limited.

7. The forward-reverse rotation device for a continuously variable transmission according to claim 6, wherein an axially opposite end face that faces in a direction opposite said tip of said input shaft is formed on said clutch drum, and a washer is provided to position said clutch drum with respect to said input shaft in an axial direction by contacting said axially opposite end face.

8. The forward-reverse rotation device for a continuously variable transmission according to claim 7, wherein a thrust bearing is further provided for supporting said input shaft in the axial direction and said washer is a portion of said thrust bearing.

9. The forward-reverse rotation device for a continuously variable transmission according to claim 1, further comprising,
   a first annular groove formed in said internal splines of said clutch drum,
   a second annular groove formed in a position corresponding to said first annular groove in a splined section of said input shaft, and
   a ring member configured to limit axial motion between said clutch drum and said input shaft, said ring member inserted into said first and second annular grooves.

10. The forward-reverse rotation device for a continuously variable transmission according to claim 6, wherein said clutch drum comprises,
   a clutch piston,
   a return spring configured to return said clutch spring, and
   a holding member configured to hold said return spring, a tip face of said holding member contacting said axially facing end face of said sun gear.

* * * * *